(12) United States Patent
Petrucelli

(10) Patent No.: US 7,889,064 B2
(45) Date of Patent: Feb. 15, 2011

(54) COMBINED TIRE PRESSURE GAUGE AND REMOTE TIRE PRESSURE DISPLAY

(75) Inventor: Steven Petrucelli, Cranbury, NJ (US)

(73) Assignee: Measurement Limited, Grand Cayman (KY)

( * ) Notice: Subject to any disclaimer, the term of this patent is extended or adjusted under 35 U.S.C. 154(b) by 283 days.

(21) Appl. No.: 12/259,046

(22) Filed: Oct. 27, 2008

(65) Prior Publication Data
US 2009/0109012 A1 Apr. 30, 2009

Related U.S. Application Data

(60) Provisional application No. 61/000,579, filed on Oct. 26, 2007.

(51) Int. Cl.
*B60C 23/00* (2006.01)
*B60C 23/02* (2006.01)
*G08B 23/00* (2006.01)

(52) U.S. Cl. .................... 340/442; 340/447; 340/693.5; 340/693.6; 73/146.2; 73/146.3; 73/146.4; 73/146.5; 73/146.8

(58) Field of Classification Search .................. None
See application file for complete search history.

(56) References Cited

U.S. PATENT DOCUMENTS

| | | | |
|---|---|---|---|
| 4,748,845 A | 6/1988 | Rocco et al. | |
| 4,827,764 A | 5/1989 | Hwang | |
| 4,845,980 A | 7/1989 | Weng | |
| 4,890,090 A * | 12/1989 | Ballyns | 340/442 |
| 4,916,944 A | 4/1990 | Ho-Chuan | |
| 4,924,697 A | 5/1990 | Hunt et al. | |
| 4,975,679 A * | 12/1990 | Ballyns | 340/442 |
| 4,998,438 A | 3/1991 | Martin | |
| 5,033,296 A | 7/1991 | Huang | |
| 5,055,826 A * | 10/1991 | Ballyns | 340/442 |
| 5,117,684 A | 6/1992 | Hwang | |

(Continued)

FOREIGN PATENT DOCUMENTS

DE  19837550 A1  2/1999

(Continued)

*Primary Examiner*—Julie Lieu
(74) *Attorney, Agent, or Firm*—Howard IP Law Group, PC

(57) ABSTRACT

A combined tire pressure gauge and remote tire pressure display includes a port adapted to couple to a vehicle tire valve stem and to open a valve in the valve stem; a chamber in physical communication with the port; a local pressure transducer in the chamber for detecting a pressure of a fluid within the vehicle tire and providing an output signal representative of the detected pressure; a wireless receiver for receiving a signal identifying a tire pressure sensor and having a detected tire pressure and for providing an output signal; a processor for receiving the output signal from the pressure transducer and the output signal from the wireless receiver, and for providing a processor output signal indicative of an identified tire and a value of the detected pressure, in a remote tire display mode, and for providing a processor output signal indicative of a detected tire pressure, in a tire pressure gauge mode; and a display coupled to the processor for providing a visible indication of detected pressure value and identified tire in accordance with the processor output signal in the remote tire display mode, and for providing a visible indication of detected pressure value in the tire pressure gauge mode.

18 Claims, 13 Drawing Sheets

U.S. PATENT DOCUMENTS

| | | |
|---|---|---|
| D366,845 S | 2/1996 | Handfield et al. |
| D366,846 S | 2/1996 | Handfield et al. |
| D390,140 S | 2/1998 | Germanton |
| D395,835 S | 7/1998 | Okuyama et al. |
| D409,509 S | 5/1999 | Petrucelli et al. |
| D409,931 S | 5/1999 | Petrucelli et al. |
| D427,092 S | 6/2000 | Wu |
| D427,093 S | 6/2000 | Wu |
| D440,893 S | 4/2001 | Van Zeyl |
| D440,894 S | 4/2001 | Van Zeyl |
| D440,895 S | 4/2001 | Van Zeyl |
| D441,674 S | 5/2001 | Van Zeyl |
| D447,970 S | 9/2001 | Cappiello et al. |
| D450,257 S | 11/2001 | Bressler et al. |
| D455,361 S | 4/2002 | Super et al. |
| D455,666 S | 4/2002 | Cappiello et al. |
| D459,257 S | 6/2002 | Petrucelli |
| D459,668 S | 7/2002 | Petrucelli |
| D462,627 S | 9/2002 | Petrucelli |
| D469,706 S | 2/2003 | Huang |
| D474,124 S | 5/2003 | Krieger et al. |
| D488,082 S | 4/2004 | Durr et al. |
| D491,480 S | 6/2004 | Huang et al. |
| D492,608 S | 7/2004 | Fujioka |
| D496,602 S | 9/2004 | Shipman |
| D498,154 S | 11/2004 | Wang |
| 6,817,235 B2 | 11/2004 | Sapir |
| D501,146 S | 1/2005 | Durr et al. |
| 6,838,983 B1* | 1/2005 | Wong ......................... 340/442 |
| D501,418 S | 2/2005 | Wang |
| D503,898 S | 4/2005 | Durr et al. |
| D504,630 S | 5/2005 | Wang |
| D505,088 S | 5/2005 | Durr et al. |
| D505,871 S | 6/2005 | Little et al. |
| D505,872 S | 6/2005 | Durr et al. |
| D506,154 S | 6/2005 | Cowan et al. |
| 7,013,722 B2 | 3/2006 | Little et al. |
| 7,040,153 B2 | 5/2006 | Kroll et al. |
| 7,185,533 B2 | 3/2007 | Lee et al. |
| 7,250,852 B1* | 7/2007 | Kell ......................... 340/447 |
| 7,383,724 B2 | 6/2008 | Petrucelli ..................... 73/146 |
| 7,667,583 B2* | 2/2010 | Petrucelli ..................... 340/442 |
| 7,737,835 B2* | 6/2010 | Kyllmann et al. ........... 340/442 |
| 7,789,112 B1* | 9/2010 | Wise ........................... 141/95 |
| 2005/0103108 A1* | 5/2005 | Little et al. ................... 73/705 |
| 2005/0138999 A1* | 6/2005 | Petrucelli ..................... 73/146 |

FOREIGN PATENT DOCUMENTS

| | | |
|---|---|---|
| GB | 2169411 A | 7/1986 |
| WO | 9607568 | 3/1996 |

* cited by examiner

US 7,889,064 B2

COMBINED TIRE PRESSURE GAUGE AND REMOTE TIRE PRESSURE DISPLAY

RELATED CASES

This application claims benefit of and priority to U.S. Provisional Patent Application Ser. No. 61/000,579, filed Oct. 26, 2007, which application is hereby incorporated by reference herein in its entirety.

FIELD OF THE INVENTION

The present invention relates to pressure measurement and pressure gauges.

BACKGROUND OF THE INVENTION

Pressure gauges are conventionally used for measuring the pressure of a gas or a liquid, such as an air pressure. Tire pressure gauges, as an example, measure the inflation pressures of vehicle tires, such information being useful for maintaining optimal tire performance and avoiding unnecessary wear. Conventional tire pressure gauges are held in the hand, and require the user to locate a tire valve, unscrew a cap from the valve, and engage the tire pressure gauge with the valve. At night, it is difficult to locate the valve. Tire valve caps are usually covered in a film of dirt, which comes off on the user's fingers when removing and replacing the cap. While some vehicles have systems for monitoring of tire pressure using tire pressure gauges with radiofrequency transmitters installed in the tires, and systems for interrogating the gauges and receiving readings installed in the vehicle, such systems are not practical to install on existing tires and vehicles.

It would be desirable for a system to provide tire pressure information to a user, without the need for the user to exit the vehicle, or for tires to be purchased equipped with internal tire pressure gauges and transmitters.

SUMMARY OF THE INVENTION

In one embodiment, a combined tire pressure gauge and remote tire pressure display includes a port adapted to couple to a vehicle tire valve stem and to open a valve in the valve stem; a chamber in physical communication with the port; a local pressure transducer in the chamber for detecting a pressure of a fluid within the vehicle tire and providing an output signal representative of the detected pressure; a wireless receiver for receiving a signal identifying a tire pressure sensor and providing a detected tire pressure and for providing an output signal; a processor for receiving the output signal from the pressure transducer and the output signal from the wireless receiver, and for providing a processor output signal indicative of an identified tire and a value of the detected pressure, in a remote tire display mode, and for providing a processor output signal indicative of a detected tire pressure, in a tire pressure gauge mode; and a display coupled to the processor for providing a visible indication of detected pressure value and identified tire in accordance with the processor output signal in the remote tire display mode, and for providing a visible indication of detected pressure value in the tire pressure gauge mode.

In another embodiment, a method of providing tire pressure measurements by a combined tire pressure gauge and remote tire pressure display includes receiving wireless signals in periodic transmissions from a plurality of tire pressure gauges measuring the tire pressure of a vehicle, the signals having data indicative of the tire pressure measurements and tire identity; displaying on a display the wirelessly received tire pressure measurements and tire identities successively for each of the tires of the vehicle; changing an operating mode; measuring a tire pressure by a local pressure sensor of the combined tire pressure gauge and remote tire pressure display; and displaying on the display in a second orientation the tire pressure measured by a local pressure sensor.

In another embodiment, a system for detecting and displaying vehicle tire pressure includes valve cap mounted tire pressure gauges for detecting tire pressure and providing wireless signals indicative of the detected tire pressure and tire pressure gauge identification; and a combined tire pressure gauge and remote tire pressure display, comprising: a housing having a display, including alphanumeric characters, on a side thereof; a port in the housing adapted to couple to a vehicle tire valve stem and to open a valve in the valve stem; a chamber in physical communication with the port; a local pressure transducer in the chamber for detecting a pressure of a fluid within the vehicle tire and providing an output signal representative of the detected pressure; a wireless receiver in the housing for receiving the wireless signals and for providing an output signal; a processor in the housing for receiving the output signal from the pressure transducer and the output signal from the wireless receiver, and for providing a processor output signal indicative of an identified tire and a value of the detected pressure, in a remote tire display mode, and for providing a processor output signal indicative of a detected tire pressure, in a tire pressure gauge mode; and a display on a face of the housing coupled to the processor for providing a visible indication of detected pressure value and identified tire in accordance with the processor output signal in the remote tire display mode, and for providing a visible indication of detected pressure value in the tire pressure gauge mode.

BRIEF DESCRIPTION OF THE DRAWINGS

Understanding of the present invention will be facilitated by considering the following detailed description of the preferred embodiments of the present invention taken in conjunction with the accompanying drawings, in which like numerals refer to like parts, and.

DETAILED DESCRIPTION OF THE PREFERRED EMBODIMENTS OF THE INVENTION

It is to be understood that the figures and descriptions of the present invention have been simplified to illustrate elements that are relevant for a clear understanding of the present invention, while eliminating, for the purpose of clarity, many other elements found in typical pressure sensing systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Further, it should be understood that the several views of the housings, displays and general configurations shown in the figures include many decorative or ornamental features, aspects of which the particulars may be changed while maintaining the device's utility and without departing from the scope and spirit of the present invention.

Figure 1:
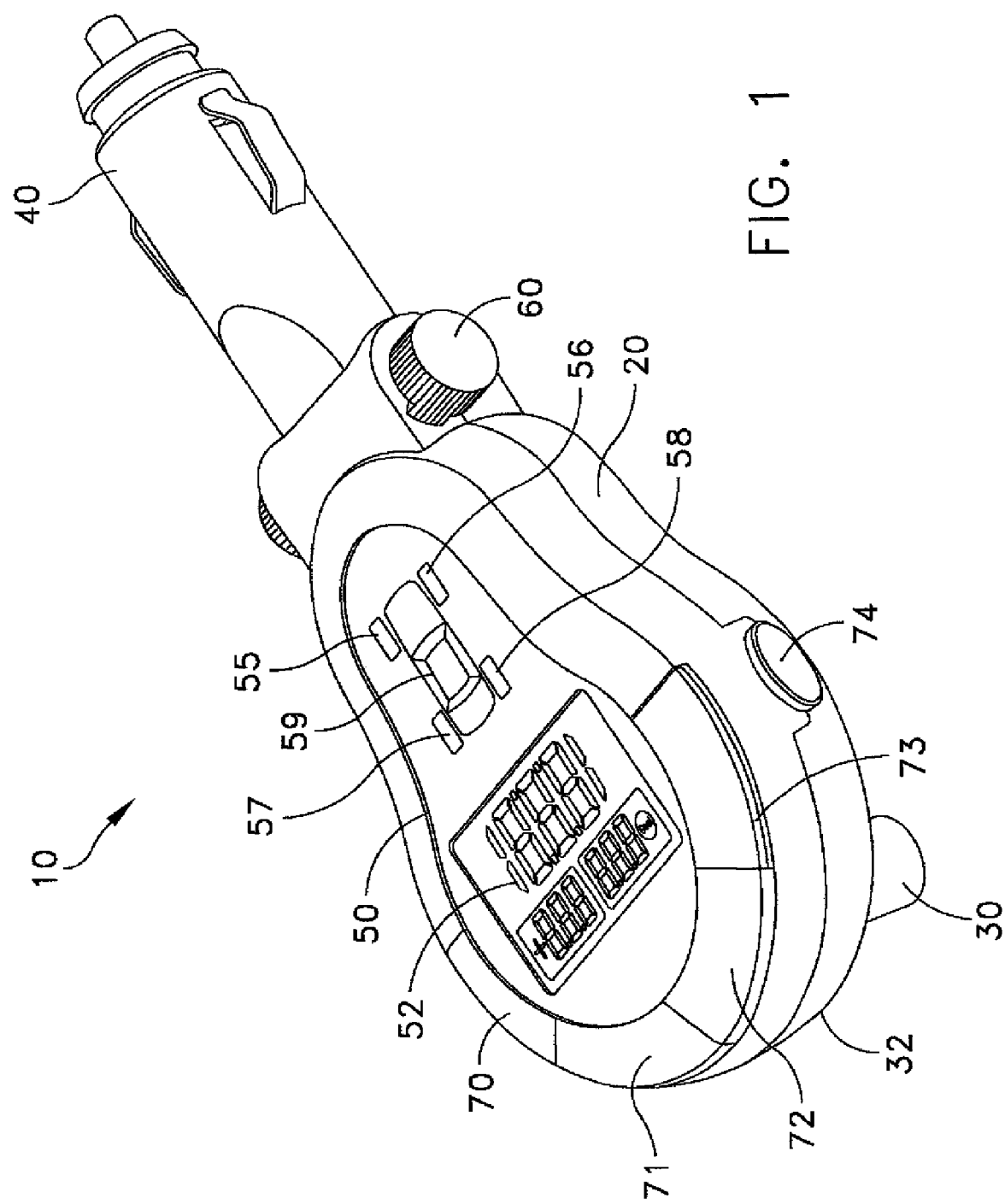
FIG. 1 is an exterior isometric view of a combined tire pressure gauge and remote pressure display according to an embodiment.
Figure 2:
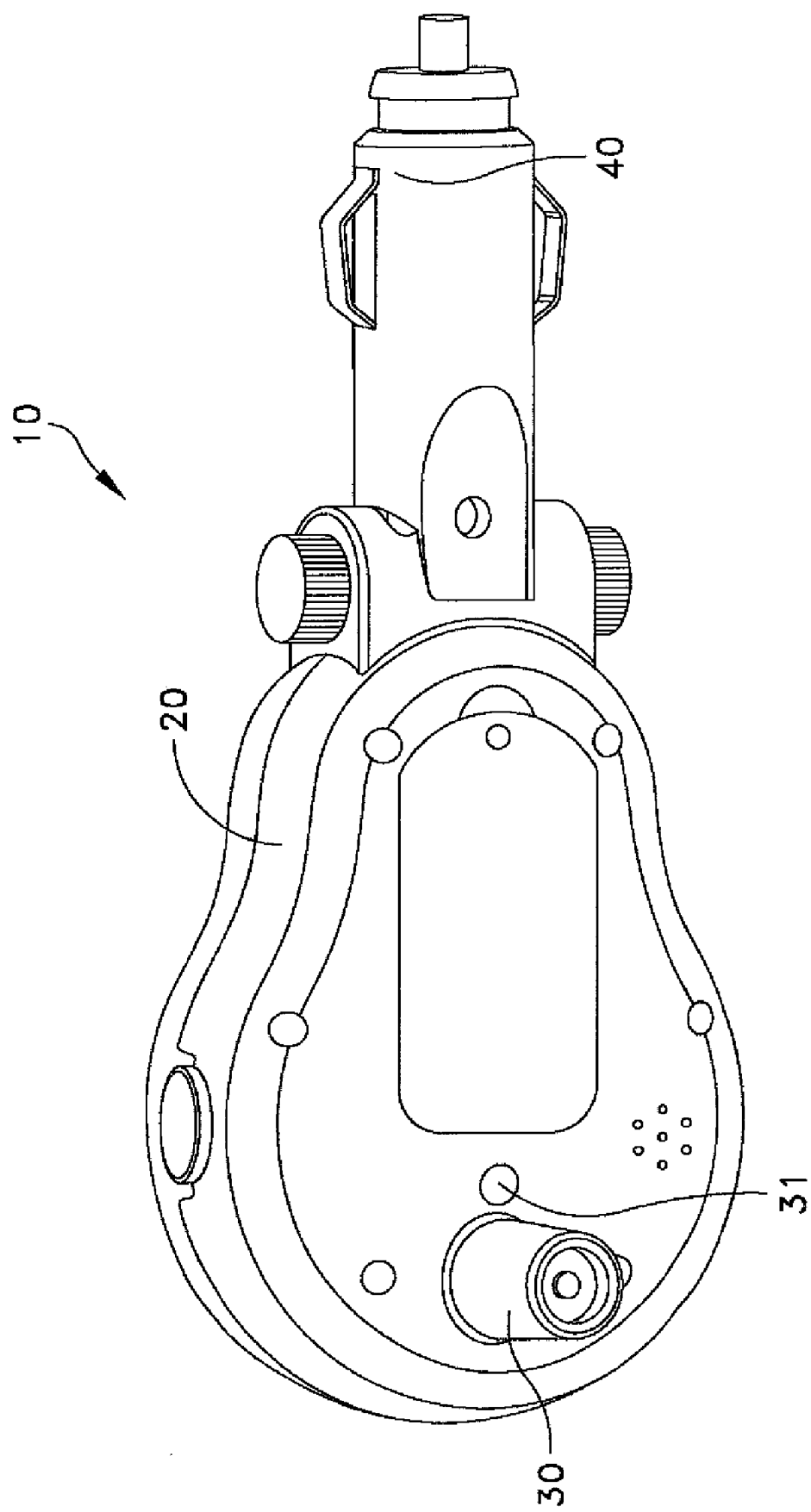
FIG. 2 is an exterior view from another angle of the device of FIG. 1.

Referring to FIGS. 1 and 2, combined tire pressure gauge and remote tire pressure display 10 is shown. Device 10 has a generally encompassing wall or housing 20. A port 30 is adapted to engage with and open the needle valve on a suitable tire valve stem. A tire valve stem is typically in the form of a tube, threaded on the exterior near the end thereof, to permit attachment of a protective cap, and having a valve, referred to variously as a pin valve, bleeder valve, or Schrader valve. This type of valve is kept normally closed by a combination of air pressure and a spring urging a stopper into contact with an opening. A pin extending out of the valve may be urged inward, such as by a piston in a nozzle of a service station air hose, to open the valve to permit the introduction of pressurized air into the tire. Port 30 may include such a pin.

Power connector 40 on housing 20 may be a plug adapted to engage with a 12 volt cigar lighter power receptacle of an automobile. Power connector 40 may meet the ANSI/SAE J563 specification, for example. It will be appreciated that the power connector 40 is merely exemplary, and that other connectors may be substituted. Power connector 40 permits device 10 to be powered from and mounted in a 12 volt cigar lighter power receptacle in an automobile dashboard, and arranged so that device 10 is readily visible to the driver. Power connector 40 is rotatably connected to the main body portion of device 10 by shaft 60. The connection may be such that the main body will remain supported in any selected orientation, or may have a number of possible positions, as through a ratchet arrangement. The user may thus select a particular fixed relative orientation of the housing 20 and power connector 40. Housing 20 encircles shaft 60 at 21, 22. A housing of power connector 40 encircles shaft 60 at 42. LED 31 is provided near port 30, and may be employed for illumination. Button 74 may be employed to activate LED 31.

Display 50 includes an alphanumeric display 52, which may be, for example, a liquid crystal display, and emitters 55, 56, 57, 58 associated with wheels of a diagram 59 of an automobile. Each emitter may be capable of outputs of different colors, generated, for example, by multi-mode LED's, or by emitters, such as LED's, of different colors.

Buttons 70, 71, 72, 73 are provided on housing 20. Buttons 70, 71, 72, 73 may include a SET button, a MODE button, an UP button, and a DOWN button.

Port 30 protrudes from the housing 20 near an end 32 of the housing 20 opposite to power connector 40. Port 30 protrudes from an opposite face of housing 20 from display 50. When port 30 is placed on a valve stem so as to provide a pressure reading, the display 50 is on the face of housing 20 near the user.

Figure 9:
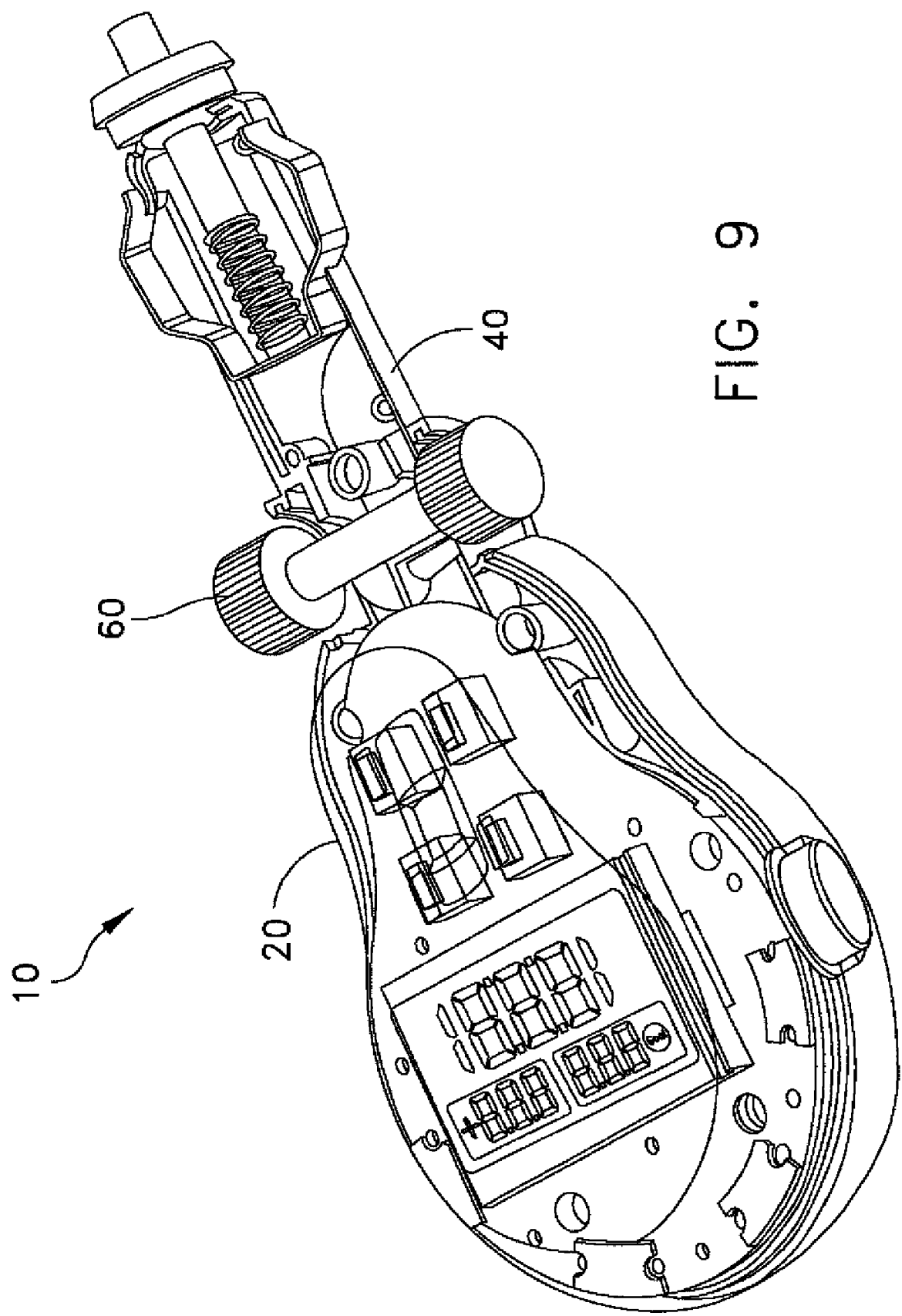
FIG. 9 is a view of the device of FIG. 1 from the front with certain covering elements removed.
Figure 10:
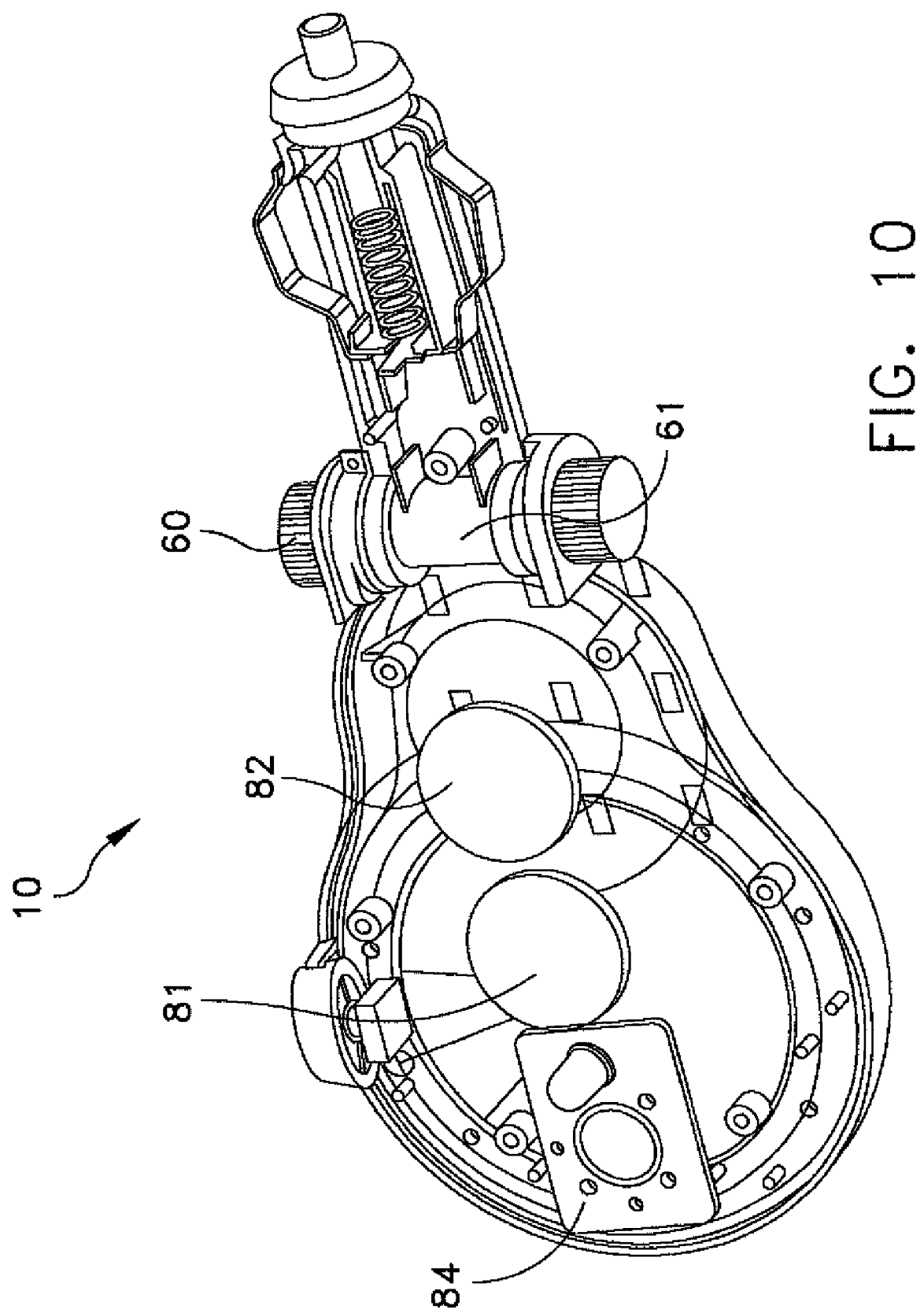
FIG. 10 is a view of the device of FIG. 1 with certain covering elements removed.

Referring now to FIG. 9, device 10 is shown with its housing 20 partially removed, and the housing of power connector 40 partially removed. Shaft 60 may be seen. Referring to FIG. 10, it may be seen that shaft 60 has a cover 61; in FIG. 9, cover 61 is removed. Batteries 81, 82, which provide power for device 10 when power is not available from the vehicle via power connector 40, are also shown in FIG. 10. Board 84, which may support a MEMS die that serves as a local pressure sensor, is also shown.

Figure 3:
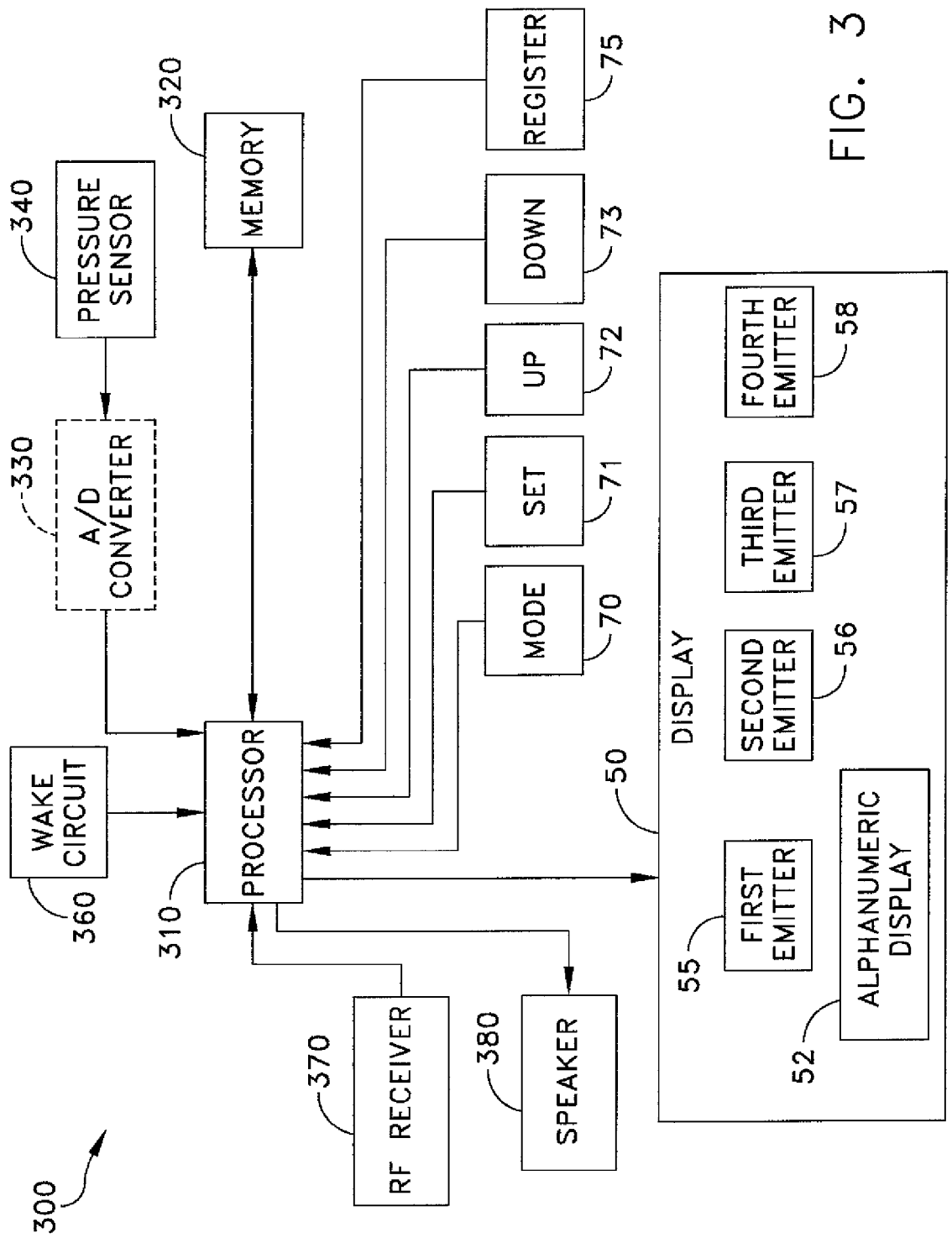
FIG. 3 is a block diagram of components of the device of FIG. 1.

Referring now to FIG. 3, there is shown a block diagrammatic view of an arrangement 300 suitable for use within device 10. Arrangement 300 generally includes a processor 310, memory 320, and optional analog to digital converter 330, pressure sensor 340, radiofrequency receiver 370, and display 50.

"Processor", as used herein, generally refers to a circuit arrangement that may be contained on one or more silicon chips, and/or integrated circuit (IC) boards, and that contains a Central Processing Unit (CPU). The CPU may generally include an arithmetic logic unit (ALU), which performs arithmetic and logical operations, and a control unit, which extracts instructions from memory and decodes and executes them, calling on the ALU when necessary.

Processor 310 may take the form of a microprocessor, and may be a low power CMOS processor with an embedded analog to digital converter, by way of non-limiting example only. The present invention is operable with computer storage products or computer readable media that contain program code for performing the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter.

Processor 310 may include multiple inputs and outputs. In the exemplary configuration illustrated in FIG. 3, processor 310 has an input coupled to wake circuit 360. An output of processor 310 is coupled to display 50. Processor 310 may also be coupled to memory 320 to allow it to access its data contents. Processor 310 may have an input coupled to pressure sensor 340 optionally via analog-to-digital converter (A/D) 330. For example, where pressure sensor 340 provides an analog output signal indicative of a pressure sensed using port 30, A/D converter 330 may communicate a digital signal indicative of the analog signal output from pressure sensor 340 to processor 310. Where pressure sensor 340 provides a digital signal directly, A/D converter 330 may optionally be omitted. In addition, where processor 310 is adapted to receive analog signals output from pressure sensor 340 directly, A/D converter 330 may optionally be omitted. A/D converter 330 may be selected based upon space limitations, an expected output from pressure sensor 340, accepted input for processor 310 and available power sources for device 10.

Memory 320 may be internal or external to processor 310. As used herein, "memory" refers generally to one or more devices capable of storing data, such as in the form of chips, tapes or disks. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further non-limiting example only.

Memory 320 may store information, or may be programmed to store information, e.g., data, indicative of threshold values for one or more tires, and/or previous measurements. The memory can be configured to store threshold values for tire pressures. By way of example, memory 320 may include one or more threshold values for each of four tires on a vehicle. In an embodiment, a default threshold value of 30 pounds per square inch may be provided for use with tires for a passenger vehicle. As explained in more detail below, threshold values may be input by the user. As will be evident to one possessing an ordinary skill in the pertinent arts, user activation of the device will cause the processor to retrieve the threshold pressure values from memory for comparison with measured pressure values. Memory 320 may also store identification information relating to valve-stem mounted tire pressure gauges, as described below in greater detail.

Display 50, as noted in FIG. 1, may include one or more separate components. Alphanumeric display 52, and first emitter 55, second emitter 56, third emitter 57 and fourth emitter 58 are indicated. As described above, emitters 55, 56, 57, 58 may include emitters of various colors, or multi-color emitters, such as multi-color LEDs, and processor 310 may be programmed to provide signals for activation of particular colors dependent on pressure readings received, such as via RF receiver 370. It will be appreciated that different patterns of light emission may correspond to different tire pressure ranges. For example, a continuous activation of an emitter may indicate an acceptable pressure, a slow blinking activation may indicate pressure between first and second thresholds, and a fast blinking activation may indicate pressure below a second threshold.

Pressure sensor 340 may be any one of a number of conventional sensors for detecting fluid pressure, and particularly air pressure, and selected to provide acceptable response over a range of pressures anticipated in a particular application. By way of example, pressure sensor 340 may incorporate a MEMS based pressure die.

RF receiver 370 may be, for example, any of a number of off-the-shelf RF receiver devices adapted for short range radiofrequency communications. In one embodiment, the frequency may be 915 MHz, using suitable signal formats. Data provided by RF receiver 370 to processor 310 may include wireless signal strength data.

In one or more embodiments, device 10 may include a device for generation of audible sound. For example, speaker 380 may be provided. Processor 310 may be able to access suitable sound files stored in memory 320 to provide one or more audible signals.

Device 10 may also include user inputs in the form of buttons or switches. In the exemplary embodiment of FIG. 3, mode button 70, set button 71, up button 72, down button 73 and registration key 75 are shown.

Figure 4:
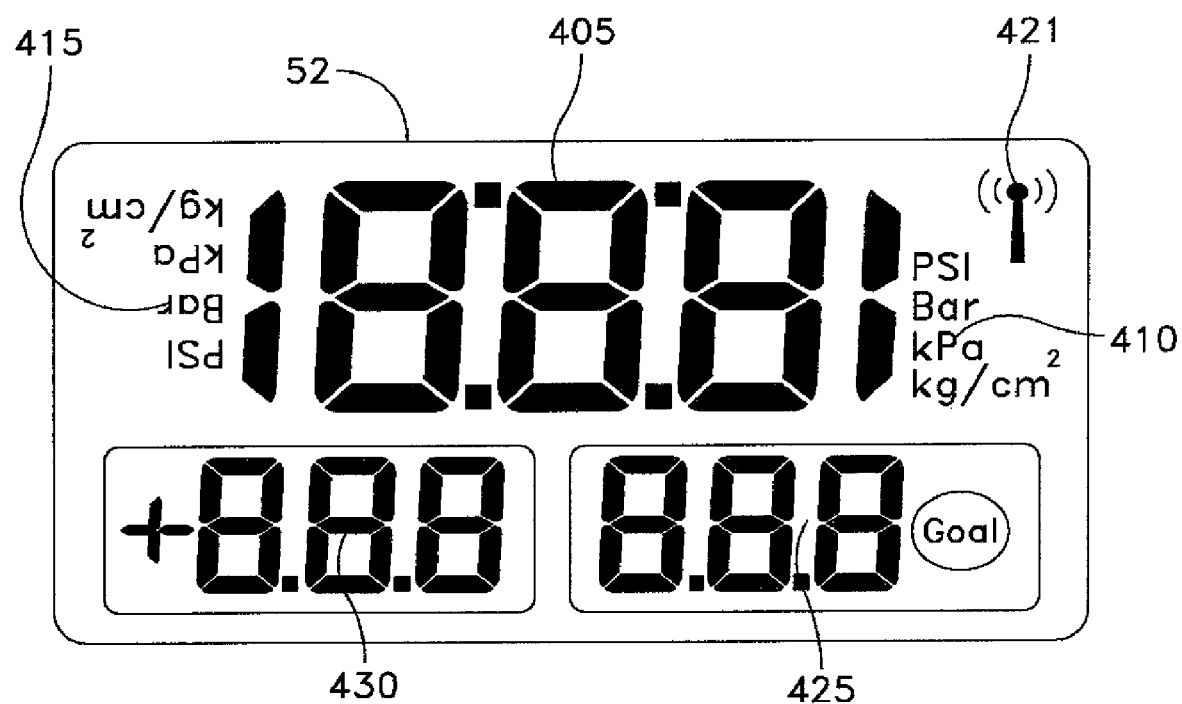
FIG. 4 is an exemplary display of the device of FIG. 1.

Display 52 will now be described in greater detail. Display 52 may be caused by processor 310 (of FIG. 3) to operate in a remote display mode, with readings oriented in a first orientation, or in a handheld tire pressure gauge mode, with readings oriented in a second orientation, which may be opposite to the first orientation. Remote display mode may desirably be used with device 10 (of FIG. 1) plugged into a suitable power receptacle in the cabin of an automobile. Handheld tire pressure gauge mode may desirably be used when tire pressures are being measured via port 30 by pressure sensor 340 (of FIG. 3). Referring now to FIG. 4, display 52 includes alphanumeric display area 405, first orientation unit display menu 410, second orientation unit display menu 415, wireless signal strength display 421, target pressure display 425, and difference display 430. When device 10 is in handheld tire pressure gauge mode, the alphanumeric display appears with the end 32 of housing 20 which port 30 is near at the top above the display. When device 10 is in remote display mode, the display 52 has an orientation such that the location where power connector 40 protrudes from the housing appears to the user, reading the display 52, to be above a top of the display 52.

Figure 5A:
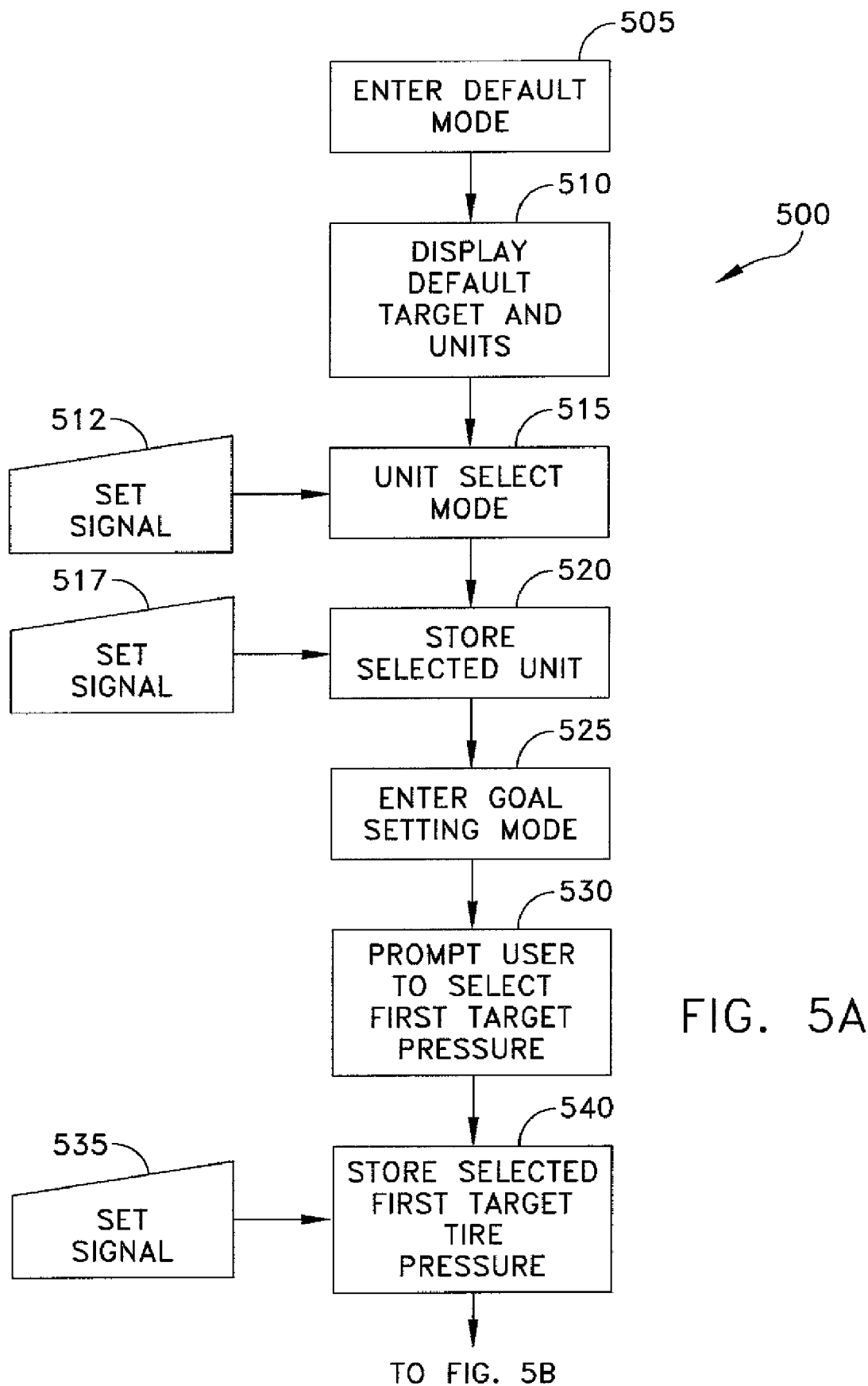
FIGS. 5A and 5B are a process flow diagram of certain steps of preparing a device of FIG. 1 for use.
Figure 5B:
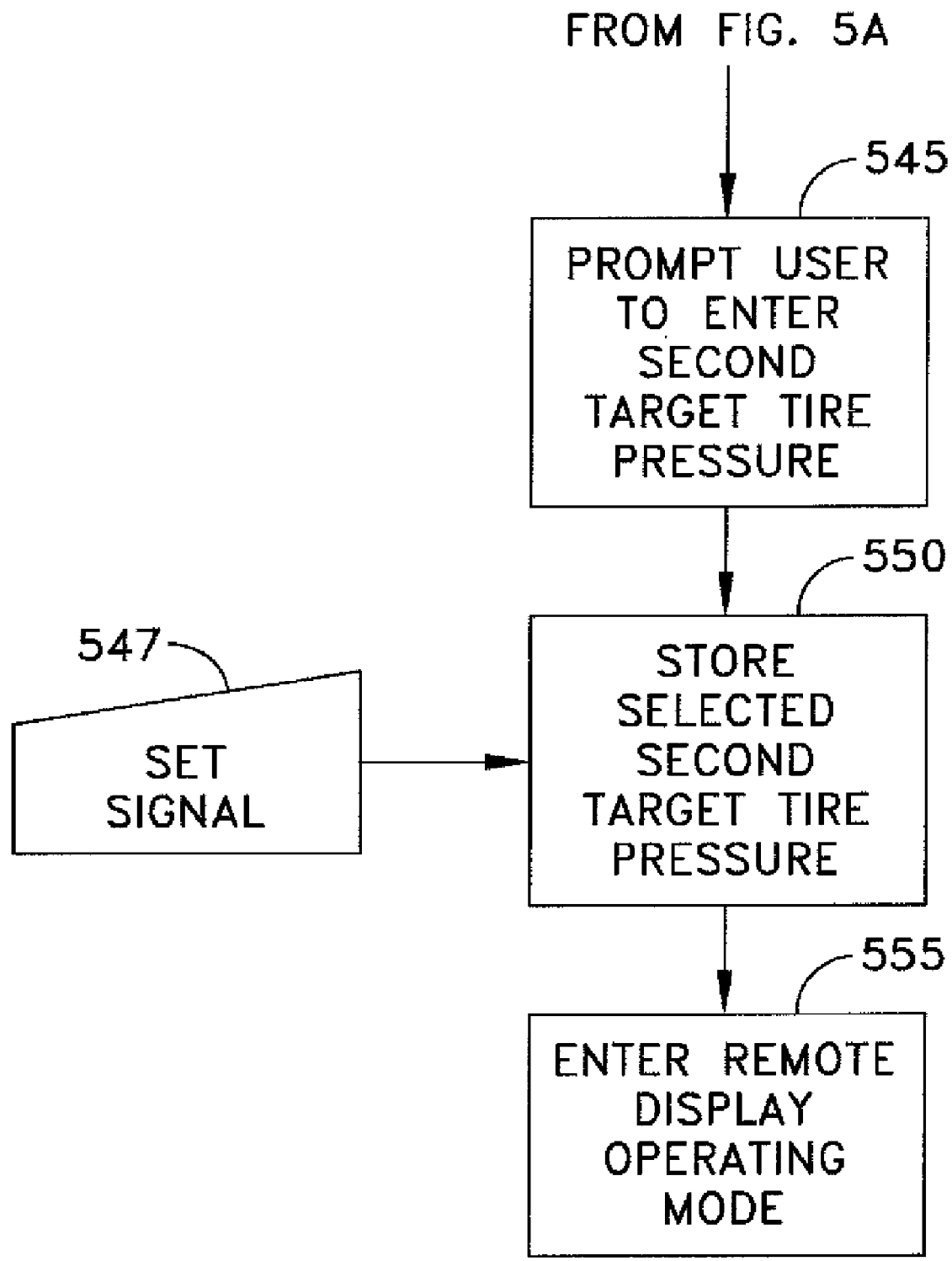
Figure 6A:
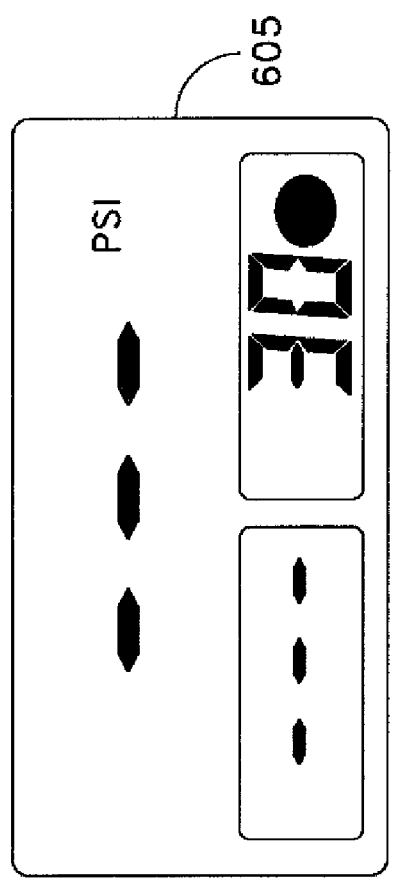
FIGS. 6A and 6B show exemplary activated displays of the device of FIG. 1.

Referring now to FIG. 5, there is shown a block diagrammatic representation of a process 500 according to an aspect of the present invention, and being suitable for use with device 10. In an initial step, indicated by block 505, upon initially powering up of device 10, the device enters a default initial display mode. In the default mode, referring, for example, to FIG. 6A, the display is shown in a default mode 605. In the default mode, processor 310 accesses, such as from memory 320, a stored default target pressure, and a stored default unit, and causes that target and unit to be displayed, as indicated by block 510. In the example of FIG. 6A, the stored default target pressure is 30, and the stored units are PSI. In the tire display, a first tire LED may be caused to light in a warning mode associated with low tire pressure, such as a red color.

In response to a SET signal, as indicated by block 512, the device enters a display unit select mode, as indicated by block 515. In the display unit select mode, a unit will blink to prompt the user to select a unit. For example, initially, PSI may blink. In response to the user pressing the up and down keys, the unit that is blinking will change. In response to a further SET signal, the unit for display will be selected and stored in memory, as indicated by block 517 and 520, and the device will enter a goal setting mode, as indicated by block 525.

In the goal setting mode, the user is prompted to enter a first target tire pressure, as indicated by block 530. The first tire pressure may be for the front tires, for example. The prompting may take the form of causing the emitters corresponding to a set of wheels, such as the front wheels or the rear wheels, to blink. A default target tire pressure is displayed, and may be incremented up and down in response to pressing of the up and down buttons by the user. When a desired first target tire pressure is displayed, the user may press the SET button. This will generate a SET signal, indicated by block 535, to the processor 310, which will then store, as indicated by block 540, the then-displayed value as the first target tire pressure in memory 320. Referring now to FIG. 5B, the processor may then prompt the user to enter a second target tire pressure, as indicated by block 545. The second target tire pressure may be for the rear tires. The prompting may take the form of causing the emitters corresponding to the rear wheels to blink. A default second target tire pressure may be displayed. The displayed second target tire pressure may be incremented up and down in response to pressing of the up and down buttons by the user. When a desired second target tire pressure is displayed, the user may press the SET button, as indicated by block 547. In response, the processor will store the then-displayed second target tire pressure in memory, as indicated by block 550. The device will then enter the remote display operating mode.

Figure 6B:
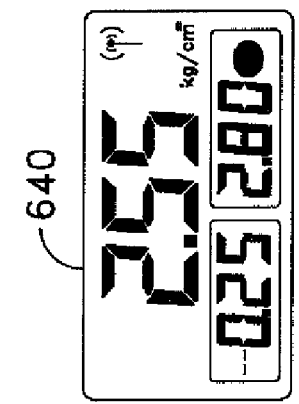
Figure 6B:
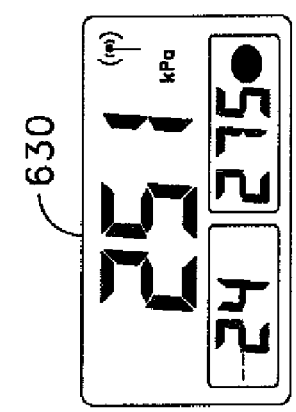
Figure 6B:
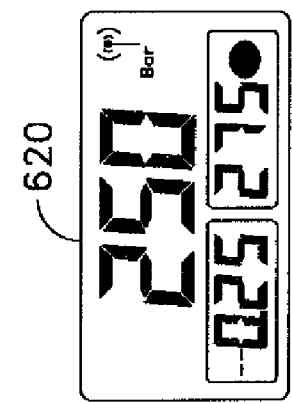
Figure 6B:
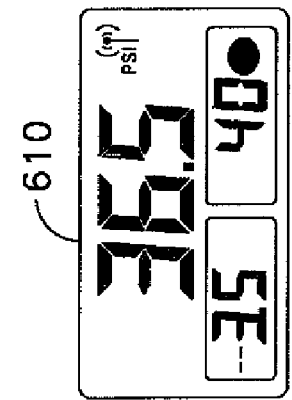

Exemplary displays of the remote display operating mode are shown in FIG. 6B. In exemplary display 610, the selected units are PSI (pounds per square inch); the selected target tire pressure is 40 PSI; the detected tire pressure is 36.5 PSI, and a difference of negative 3.5 PSI has been calculated and displayed. In exemplary display 620, the selected units are bars; the target pressure is 2.75 bars; the detected tire pressure is 2.50 bars, and a difference of negative 0.25 bars has been calculated and displayed. In exemplary display 630, the selected units are kPa (kilopascals); the target pressure is 274 kPa; the detected tire pressure is 251 kPa, and a difference of negative 24 kPa has been detected and displayed. In exemplary display 640, the selected units are $kg/cm^2$ (kilograms per square centimeter); the target pressure is 2.8 $kg/cm^2$; the detected tire pressure is 2.55 $kg/cm^{2'}$ and a difference of negative 0.25 $kg/cm^2$ has been calculated and displayed. It will be appreciated that these values are merely exemplary.

Figure 11:
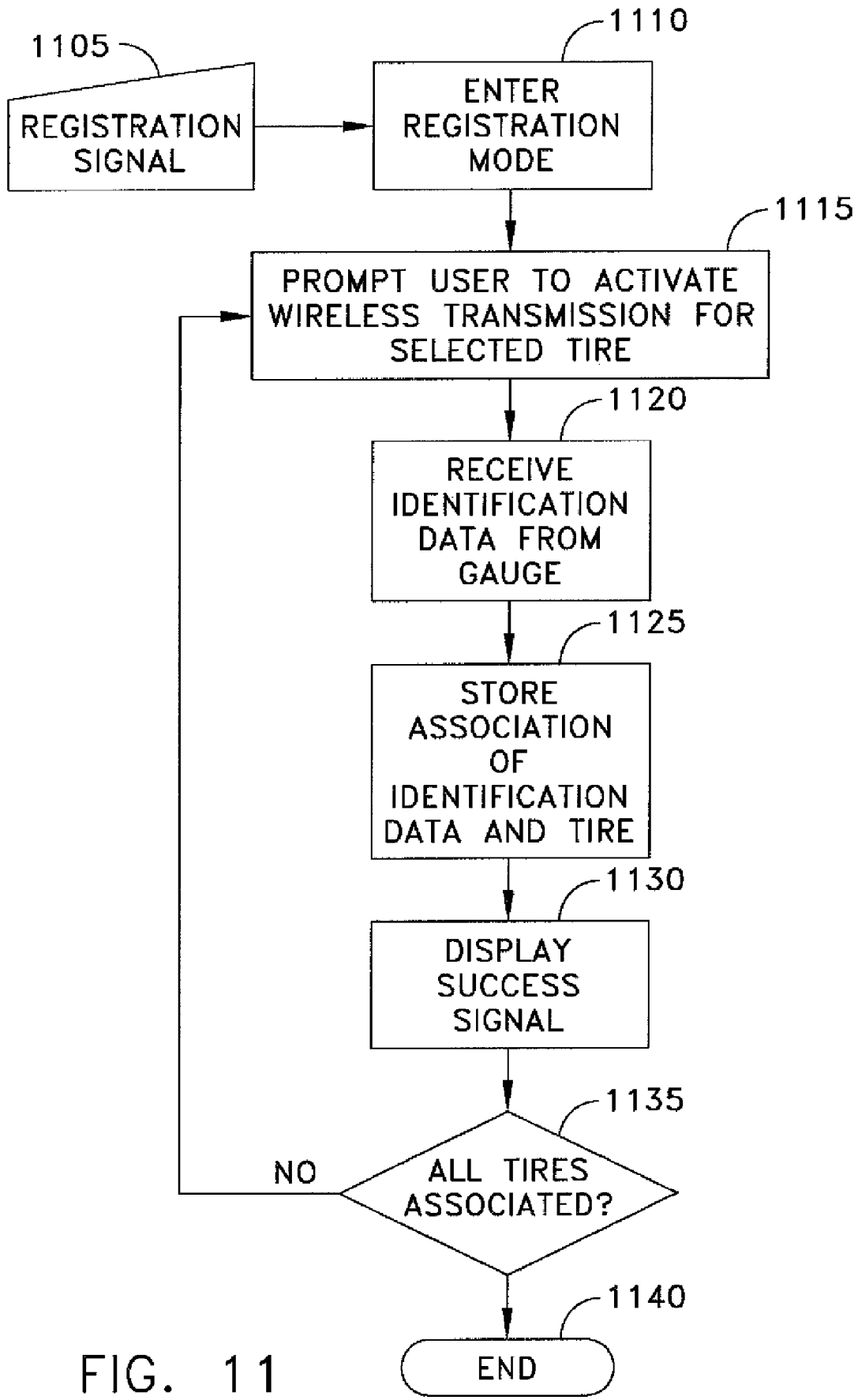
FIG. 11 is a process flow diagram of a process for registration of valve cap mounted tire pressure gauges with a remote tire pressure display unit.

A process flow for registration of valve cap mounted tire pressure sensors and transmitters with the device 10 will be described with reference to FIG. 11. A user causes a registration signal, as indicated by block 1105 to be sent to processor 310, such as by pressing a registration key, which may be recessed in any suitable location, so that it is not inadvertently pressed during normal use. In response, the device 10 enters registration mode, as indicated by block 1110. The device prompts the user to activate a wireless transmission from the valve-stem mounted tire pressure gauge mounted on a particular tire, as indicated by block 1115, which transmission includes at least tire pressure gauge identification information. The prompting may include blinking the emitter associated with the particular tire. The identification information may be an alphanumeric sequence, which sequence is different at least for each tire pressure gauge on a particular vehicle that is stored in a memory of the valve-stem mounted tire pressure gauge. The user may cause the valve-stem mounted tire pressure gauge to emit a signal by attaching the gauge to a valve stem; in response to detecting an increase in pressure of, for example, over a threshold of 30% between readings, the gauge emits a signal continuously for 3 seconds, and then repeats the signal again after an interval, such as 15 seconds. This signal includes an identification for the gauge. When the identification is received, as indicated by block 1120, processor stores the identification and an association between the identification and a particular tire, as indicated by block 1125. When the processor has completed storing this information, the processor may cause a success signal to be displayed, as indicated by block 1130. For example, the success signal may include blinking the emitter associated with the particular tire a selected number of times in a color different from the color of the prompting signal. For example, the success signal may include blinking the emitter in green three times.

If not all of the tires have an associated identification stored in memory, then, as indicated by block 1135, the processor may then prompt the user to cause another one of the gauges to emit an identification signal. The process is then repeated until an identification is associated with each tire in memory 320, and then the registration process ends, as indicated by block 1140.

Figure 7:
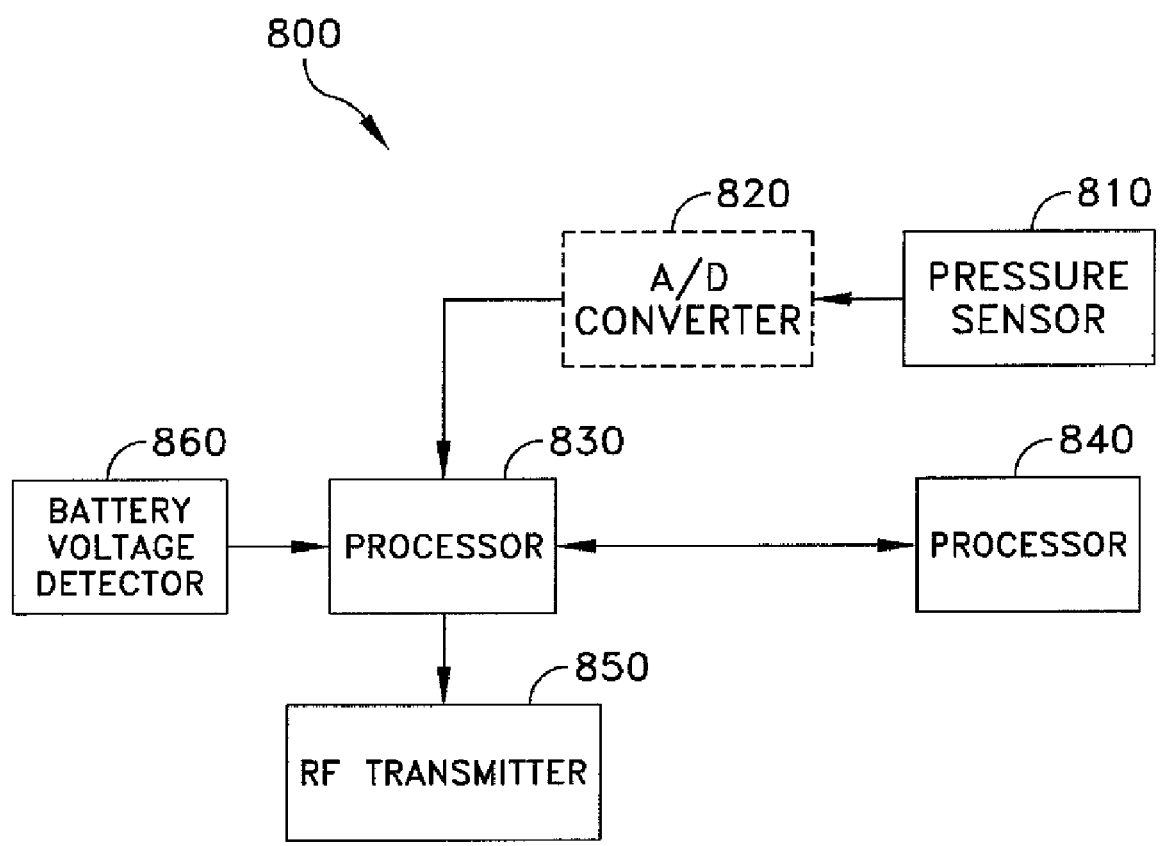
FIG. 7 is a block diagram of components of a valve-stem mounted tire pressure gauge for use with the device of FIG. 1.

An exemplary valve cap mounted tire pressure gauge 800 will now be discussed, with reference to FIG. 7. Gauge 800 has a pressure sensor 810, which outputs a signal indicative of a detected air pressure, to optional A/D converter 820. If optional A/D converter 820 is present, A/D converter 820 receives an output analog signal from pressure sensor 810, and outputs a digital signal indicative of the detected pressure to processor 830. Processor 830 wakes at selected intervals. The intervals may be, by way of example, every 15 seconds, 25 seconds, 35 seconds, or 1 minute, or other regular or varying intervals. Processor 830 receives the signal indicative of the detected tire pressure. Processor 830 stores the current detected tire pressure in memory 840. Processor 830 may read the current detected tire pressure once, or may read the tire pressure more than one time, e.g., 3 or 5 times. The processor may take an average, median, or mean of the readings as the current tire pressure. Processor 830 also compares the current detected tire pressure to prior tire pressure data stored in memory. For example, processor 830 may compare the current detected tire pressure to the prior detected tire pressure. If the difference between the current detected tire pressure and the prior detected tire pressure is not more than a first threshold, then an interval between data transmissions remains at a standard interval. The first threshold may be, for example, one PSI. The standard interval may be, for example, 30 minutes, one hour or 2 hours. Processor 830 then compares the time elapsed since the most recent data transmission to the standard interval. If the time since the last data transmission is at least the standard interval, then processor 830 causes RF transmitter 850 to transmit a signal including at least an identifier associated with gauge 800, and the most recent detected tire pressure. RF transmitter 850 is a transmitter capable of providing a wireless transmission compatible with the receiver in device 10. If the time since the last data transmission is less than the standard interval, then processor 830 may return to a sleep or powered down state.

If the result of the comparison of the current tire pressure to the most recent stored tire pressure is above the first threshold, but below a second threshold, then the interval between data transmissions may be reduced from the standard interval to a first reduced interval. The first reduced interval may be, for example, five minutes, ten minutes or fifteen minutes. The processor then compares the time since the most recent data transmission to the first reduced interval. If the elapsed time since the most recent data transmission is more than the first reduced interval, then processor 830 causes RF transmitter 850 to send a wireless transmission including an identifier and the current detected pressure. The processor then goes into a powered down or sleep mode.

If the processor is using the first reduced interval for data transmission, then the processor both compares the current detected pressure to the prior detected pressure, and compares the current detected pressure to additional prior detected pressures. For example, the processor may store the prior transmitted pressures, and compare the current detected pressure to prior transmitted pressures. For example, the processor may determine whether a threshold number of pressures have been transmitted using the first reduced interval. If the threshold number of pressures have not been transmitted, then the device continues to use the first reduced interval. If the threshold number have been transmitted, and the comparison shows that the current detected pressure is the same as the transmitted readings during use of the first reduced interval, then the interval for data transmission may be changed to the standard interval. The threshold here may be 5 transmissions using the first reduced interval. Otherwise, the device continues to use the first reduced interval.

If the difference in pressure between two consecutive readings is greater than a second threshold, then there is an indication of a leak. The second threshold may be, for example, 4 or 5 PSI. In that event, the transmission interval is changed to a second reduced interval, less than the first reduced interval.

For example, a second reduced interval may be 30 seconds, 1 minute, or 2 minutes. Transmissions at the second reduced interval may continue until it has been determined that there has been no change in pressure for a selected number of readings, such as over a period of ten transmissions.

During each reading, a battery voltage reading is also supplied to the processor by battery voltage detector 860. The processor compares the battery voltage to a threshold, such as 2.6 volts or 2.4 volts. If the battery voltage is below the threshold, then a low voltage warning signal is included in the next transmission.

The operation of the device 10 will now be described. During operation in a normal mode, the processor causes the display 52 successively to display pressures associated with each of the tires of the vehicle. The processor may activate one of emitters 55, 56, 57, 58, for a selected time period, such as three seconds. In an embodiment, a color of the emitter is selected based on a comparison of the detected tire pressure with a target tire pressure.

Figure 8:
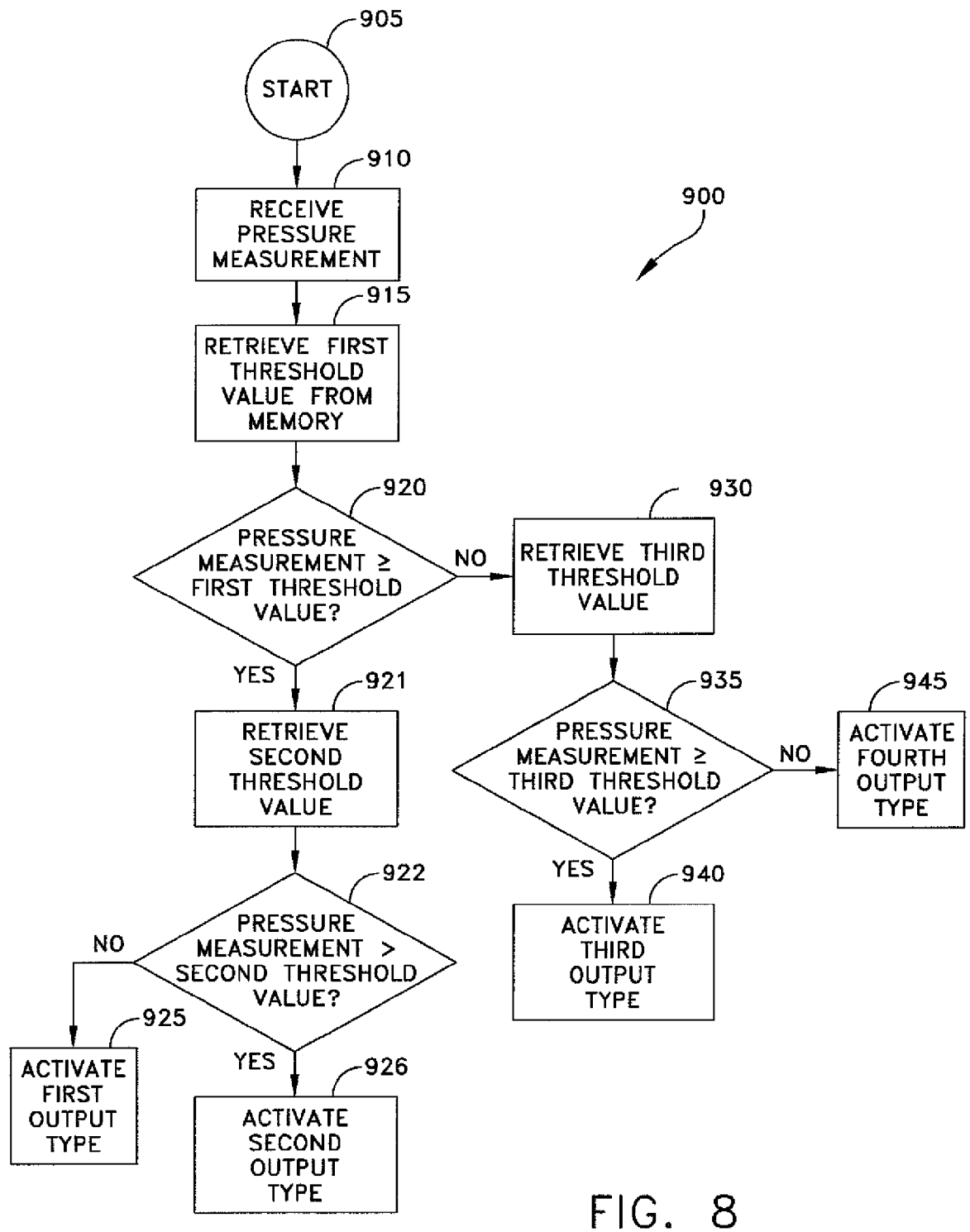
FIG. 8 is a process flow diagram for display of various outputs in the device of FIG. 1.

Referring now also to FIG. 8, processor 310 receives a measured tire pressure value via RF signal from a valve-stem mounted tire pressure gauge. Processor 310 may store the received measured tire pressure value in memory. Processor 310 may then retrieve a first threshold value from memory, as indicated by block 915. The first threshold value may be, for example, 90 percent of the stored target tire pressure. Processor 310 may then compare the received measured tire pressure value to the first threshold value to determine whether the received measured tire pressure value is greater than or equal to the first threshold value, as indicated by block 920. If the result of the comparison is that the measured pressure value is greater than or equal to the first threshold value, then the processor proceeds to retrieving a second threshold value from memory, as indicated by block 921. The second threshold value may be a value greater than the stored target tire pressure, such as 120 percent of the stored target tire pressure. The process flow then proceeds to determining whether the received measured tire pressure value is greater than or equal to the second threshold value, as indicated by block 922. If the result of the comparison is that the measured value is less than the second threshold, then the process flow proceeds to activating a first output type of the emitter, as indicated by block 925. A first output type may provide an indication that the pressure is acceptable, and may be in the nature of, by way of example, activation of a green LED, activation of a multi-color LED to provide a green output, or activation of a lamp to provide a continuous light or an on/off pattern, any one of which may be understood by a user to indicate an acceptable pressure value. If the result of the comparison is that the measured value is greater than the second threshold, then the process flow proceeds to activating a second output type of the emitter, as indicated by block 926. A second output type may provide an indication that the pressure represents a significant overpressurization, and may be in the nature of, by way of example, activation of a blue LED, activation of a multi-color LED to provide a blue output, or activation of a lamp to provide a continuous light or an on/off pattern, any one of which may be understood by a user to indicate a significant overpressurization, requiring a reduction in pressure.

If the result of the comparison step of block 920 is that the measured tire pressure is less than the first threshold, then the processor retrieves a third threshold value from memory, as indicated by block 930. The third threshold value may be a value selected to indicate a threshold between slight under pressurization and unacceptably low pressurization, such as 80% of the target pressure. The process then compares the measured tire pressure to the third threshold value, as indicated by block 935. If the result of the comparison is that the pressure measurement is equal to or greater than the third threshold value, then the process flow proceeds to activating a third output type, as indicated by block 940. The third output type is distinguishable to a user from the first and second output types. By way of example, the third output type may be an LED of a different color from an LED of the first and second output types. The third output type may be an activation of a yellow LED, where the first output type is an activation of a green LED, and the second output type is activation of a blue LED. If the emitter includes a multi-color LED, the third output type may be an activation of the multi-color LED to provide a different color from that of the first and second output types. The third output type may be a different pattern of on/off from that of the first and second output types; for example, the first output type may be a continuous on; the second output type may be blinking at a specified rate; and the third output type may be blinking at a rate different from the blinking of the second output type.

If the result of the comparison of the measured pressure and the third threshold value is that the measured pressure is less than the third threshold value, then the process flow proceeds to activation of a fourth output type, as indicated by block 945. If measured pressure is below the third threshold value, then, in some embodiments, the measured pressure is sufficiently below the recommended pressure as to result in undesirable effects such as excessive wear on the tire and reduced fuel economy. Accordingly, a fourth output type may be, for example, a red light, such as a red LED, or a red output of a multi-color LED.

At the same time as activation of the fourth output type, the processor may cause the speaker to activate to cause an audible warning. The audible warning may be a tone or beep, or a recorded verbal message. In one embodiment, a beeping tone may be repeated at 1 MHz for a selected period of time.

At the same time as the emitter is activated, display 52 shows the detected pressure, the target pressure, and the difference between the two.

The processor may cause the four emitters to light successively in the appropriate output type, with display 52 showing the corresponding numerical data.

If a MODE signal is received, i.e. by a user pressing the MODE key, the device changes from the above-described automatic scan mode to a manual scan mode. In a manual scan mode, the user may select the tire by pressing the up and down keys. After an up or down signal is received, the processor causes the emitter associated with the next tire in sequence to be activated, and display 52 to show the tire pressure information associated with that tire.

In the automatic scan mode, if the processor receives an up or down signal, as the result of a user pressing the up or down button, then the device enters the manual scan mode. If no up or down signal is received for a selected time period, such as 10 or 15 seconds, then the device returns to the automatic scan mode.

An alarm may sound if there is a drop in tire pressure from any gauge above a selected threshold between successive transmissions. A threshold may be 4 PSI or 5 PSI, for example. The alarm may be a beep or tone cycled on and off at 1 Hz, for example, for a period of time, such as 20 seconds. The processor may also cease the alarm if a signal is received from any key, or from a particular key. The processor may reactivate the alarm after a selected period of time, such as 5 minutes.

The processor may also cause an alarm to be sounded if a valve cap mounted tire pressure gauge is detected to be defective.

If no data is received from one of the tire pressure gauges for a selected period of time, such as 24 hours, then the processor may cause an audible alarm to be sounded. The audible alarm may be different from the alarm for other situations, such as a drop in pressure or a low pressure condition. For example, the audible alarm may be two tones of one second duration, separated by a one second interval, and then repeated at intervals, such as intervals of four seconds. The processor may cause this alarm to continue, for example, for 30 seconds, unless a signal is received from any key. The processor may cause the alarm to be repeated after a selected interval, such as 30 minutes.

Various alarm conditions may be provided with various priorities. For example, the priority may be, from highest to lowest, a drop in pressure between transmissions in excess of a threshold, tire pressure below a lower threshold (such as 80% of target pressure), detected defective gauge; no data received from a gauge for a time period; and no signal from a gauge for a time period. If the processor detects that more than one alarm condition is in effect, then the alarm associated only with the highest priority alarm condition will be sounded.

If the processor detects that a gauge has provided a low battery signal, then the processor will cause display 52 to indicate a low battery condition, such as by providing the lettering LO on display 52, and/or by blinking the corresponding emitter.

The device 10 has a tire pressure gauge mode. The tire pressure gauge mode may be selected, for example, by pressing the MODE button when the device 10 is in manual scan mode. In another embodiment, the device enters tire pressure gauge mode when zero voltage is detected through the power supply connection. A voltage detecting circuit may be provided with an output provided to the processor, for example. In the tire pressure gauge mode, the processor causes display 52 to provide an inverted display orientation. In the inverted display orientation, a unit from second orientation unit display menu 415 is activated, and first orientation unit display menu 410, target display 425 and difference display 430 are not activated. Display 52 is inverted. The user may then apply port 30 to a valve stem, with a top of the display near end 32 of the device 10.

Figure 12:
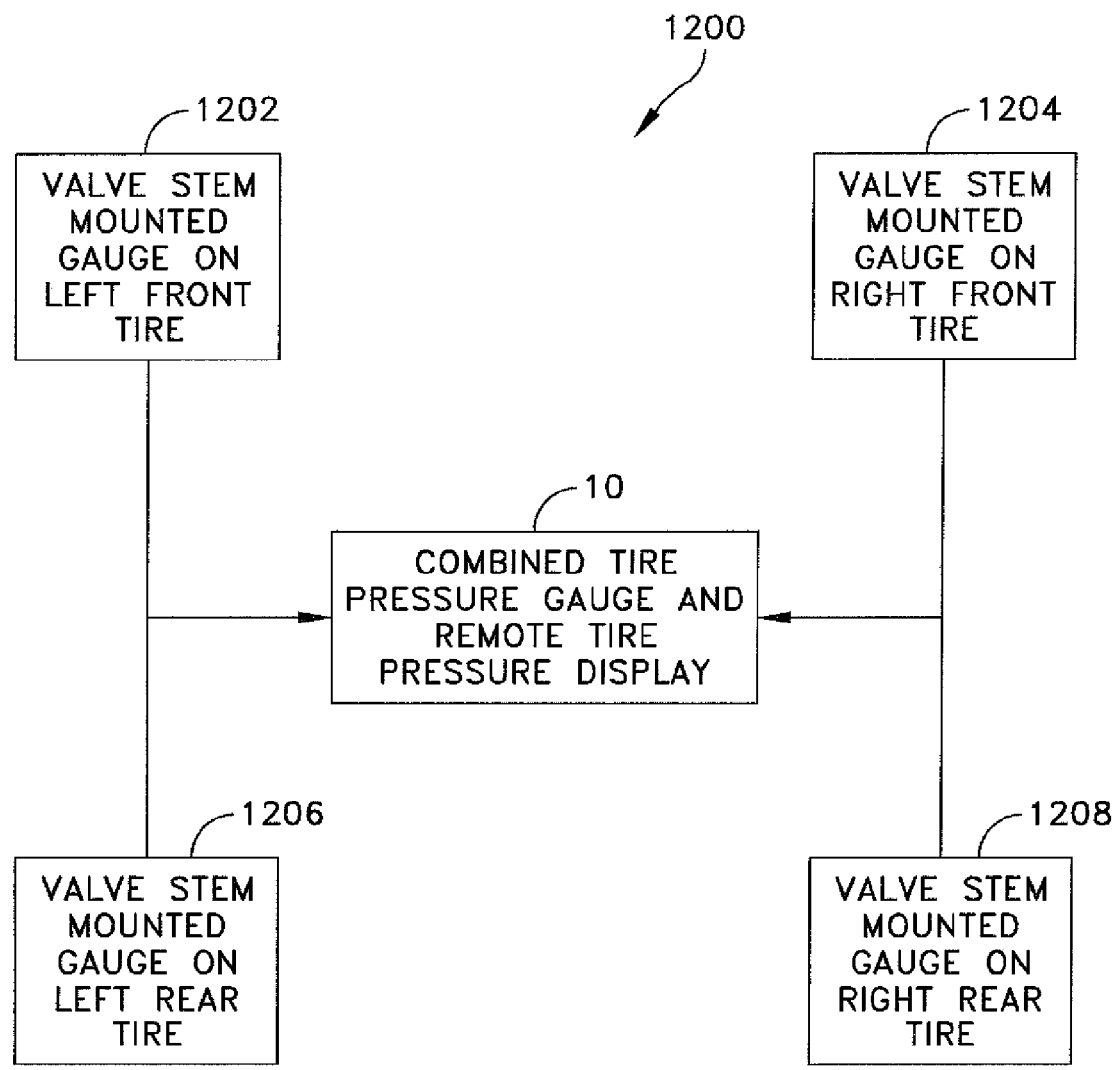
FIG. 12 is a block diagram of a system for detecting and displaying tire pressure data.

Referring to FIG. 12, in an embodiment, a system 1200 for detecting and displaying vehicle tire pressure is shown schematically. Combined tire pressure gauge and remote tire pressure display 10 receives via wireless communication identification data, tire pressure data, and possibly other data, such as low battery indication data, from valve cap mounted tire pressure gauges with wireless transmitters. In the exemplary system 1200, for a vehicle with four tires, valve cap mounted tire pressure gauge 1202 is on a valve stem of a left front tire, valve cap mounted tire pressure gauge 1204 is a on a valve stem of a right front tire, valve cap mounted tire pressure gauge 1206 is on a valve stem of a left rear tire, and valve cap mounted tire pressure gauge 1208 is on a valve stem of a right rear tire. Valve cap mounted tire pressure gauges 1202, 1204, 1206, 1208 may be identical to gauge 800, by way of non-limiting example.

The valve cap mounted tire pressure gauges may be similar to those depicted in FIG. 9 of my copending U.S. patent application Ser. No. 11/589,329, filed Oct. 27, 2006, which application is incorporated by reference in its entirety. Those tire pressure gauges include as a power source a battery adapted to be removed and replaced easily. In particular, such a tire pressure gauge includes a battery compartment having a lid which may be removed and replaced readily, and particularly by rotating. The lid is generally a solid cylinder, and has a latch, which mates with a protrusion. By placing a flat object, such as a coin or screwdriver blade, into a slot provided in the lid, the user may turn the lid sufficiently to disengage the latch from the protrusion, and thereby remove the lid and remove and replace the battery. An O-ring may be provided to prevent moisture from entering the interior of battery compartment. The valve-stem mounted tire pressure gauges include an RF emitter, and may not include any light emitting device. The entire housing of the valve-stem mounted tire pressure gauges may be opaque. Alternatively, the housing may include one or more transparent portions, and a light emitter, such as a four color LED may be provided, as described in the above-mentioned Ser. No. 11/589,329.

It will be appreciated that each of the ports for coupling to and mounting to a valve stem of a vehicle tire may be adapted to mount on a valve stem by virtue of having interior threads which permits them to be screwed or threaded onto a valve stem. It will be appreciated that alternative structures may be included in the port for providing that the port is adapted to mount on a valve stem. The ports for coupling to and mounting on a valve stem may be adapted to couple to and mount on a valve stem with no modification to the valve stem.

It will be appreciated that an embodiment of the invention is a system of valve-stem mountable tire pressure gauges and a device 10 as described above.

Exemplary materials may be employed. For example, the covers of device 10 may be of ABS. Shaft 60 may be of aluminum. The housing of the valve-stem mounted tire pressure gauges may be of polycarbonate.

The foregoing description of the embodiments of this invention has been presented for purposes of illustration and description. It is not intended to be exhaustive or to limit the invention to the forms explicitly disclosed, as many modifications and variations are possible without departing from the scope and spirit of the present invention. It will also be appreciated that features, components, processes and process steps from various embodiments disclosed above may be incorporated in others of the embodiments disclosed above. As an example, the device's exterior appearance may be modified and the accompanying processing steps, electronic components or circuitry may also be changed.

What is claimed is:

1. A combined tire pressure gauge and remote tire pressure display, comprising:
   a housing;
   a port in the housing adapted to couple to a vehicle tire valve stem and to open a valve in the valve stem;
   a chamber in physical communication with the port;
   a local pressure transducer in the chamber for detecting a pressure of a fluid within the vehicle tire and providing an output signal representative of the detected pressure;
   a wireless receiver in the housing for receiving a signal identifying a tire pressure sensor and providing a detected tire pressure and for providing an output signal;
   a processor in the housing for receiving the output signal from the pressure transducer and the output signal from the wireless receiver, and for providing a processor output signal indicative of an identified tire and a value of the detected pressure, in a remote tire display mode, and for providing a processor output signal indicative of a detected tire pressure, in a tire pressure gauge mode;
   a display on a face of the housing coupled to the processor for providing a visible indication of detected pressure value and identified tire in accordance with the processor output signal in the remote tire display mode, and for providing a visible indication of detected pressure value in the tire pressure gauge mode in a second orientation different from the first orientation; and wherein the display provides the visible indication in the remote tire display mode in a first orientation, and provides the visible indication of detected pressure value in the tire pressure gauge mode in a second orientation different from the first orientation.

2. The combined tire pressure gauge and remote tire pressure display of claim 1, wherein the second orientation is opposite to the first orientation.

3. The combined tire pressure gauge and remote tire pressure display of claim 2, further comprising a power connector protruding from the housing at a location appearing to be above a top of the display when the display is operating in the first orientation.

4. The combined tire pressure gauge and remote tire pressure display of claim 3, wherein the power connector is a plug adapted to engage with a 12 volt cigar lighter power receptacle of an automobile.

5. The combined tire pressure gauge and remote tire pressure display of claim 3, wherein the port protrudes from the housing opposite to the display.

6. The combined tire pressure gauge and remote tire pressure display of claim 3, wherein the housing has a main body portion, the display being on the main body portion, and the power connector being rotatably connected to the main body portion.

7. The combined pressure gauge and remote tire pressure display of claim 6, wherein the port protrudes from the housing near an end of the housing opposite to the power connector.

8. The combined tire pressure gauge and remote tire pressure display of claim 7, wherein the power connector is a plug adapted to engage with a 12 volt cigar lighter power receptacle of an automobile.

9. The combined tire pressure gauge and remote tire pressure display of claim 6, wherein, if no current is detected from the power connector, the processor selects the tire pressure gauge mode.

10. The combined tire pressure gauge and remote tire pressure display of claim 6, wherein the main body portion is adapted to be supported in a fixed orientation relative to the power connector.

11. A method of providing tire pressure measurements by a combined tire pressure gauge and remote tire pressure display, comprising:

receiving by the combined tire pressure gauge and remote tire pressure display wireless signals in periodic transmissions from a plurality of tire pressure gauges measuring the tire pressure of a vehicle, the signals having data indicative of the tire pressure measurements and tire identity;

displaying on a display of the combined tire pressure gauge and remote tire pressure display in a first orientation the wirelessly received tire pressure measurements and tire identities successively for each of the tires of the vehicle;

changing an operating mode of the combined tire pressure gauge and remote tire pressure display;

measuring a tire pressure by a local pressure sensor of the combined tire pressure gauge and remote tire pressure display; and displaying on the display of the combined tire pressure gauge and remote tire pressure display the tire pressure measured by a local pressure sensor in a second orientation different from the first orientation.

12. The method of claim 11, further comprising a step of displaying differences between target pressures and the wirelessly received tire pressure measurements.

13. The method of claim 11, wherein the step of changing display mode is performed in response to detection of zero voltage from a power connector.

14. The method of claim 11, further comprising, in response to receiving wireless signals in successive transmissions from one of the tire pressure gauges indicative of a drop in pressure greater than a threshold, causing an audible alarm to sound.

15. The method of claim 11, further comprising, in response to receiving a signal from one of the tire pressure gauges indicative of tire pressure below a lower threshold, causing an audible alarm to sound.

16. The method of claim 11, further comprising, in response to receiving a mode change signal from a user, changing to a manual scan mode in which a tire pressure of a selected tire is displayed until a user selection is received.

17. A system for detecting and displaying vehicle tire pressure, comprising:

a plurality of valve cap mounted tire pressure gauges for detecting tire pressure and providing wireless signals indicative of the detected tire pressure and tire pressure gauge identification; and a combined tire pressure gauge and remote tire pressure display, comprising:

a housing having a display, including alphanumeric characters, on a side thereof;

a port in the housing adapted to couple to a vehicle tire valve stem and to open a valve in the valve stem;

a chamber in physical communication with the port;

a local pressure transducer in the chamber for detecting a pressure of a fluid within the vehicle tire and providing an output signal representative of the detected pressure;

a wireless receiver in the housing for receiving the wireless signals and for providing an output signal;

a processor in the housing for receiving the output signal from the pressure transducer and the output signal from the wireless receiver, and for providing a processor output signal indicative of an identified tire and a value of the detected pressure, in a remote tire display mode, and for providing a processor output signal indicative of a detected tire pressure, in a tire pressure gauge mode; and a display on a face of the housing coupled to the processor for providing a visible indication of detected pressure value and identified tire in accordance with the processor output signal in the remote tire display mode, and for providing a visible indication of detected pressure value in the tire pressure gauge mode;

wherein the display of the combined tire pressure gauge and remote tire pressure display provides the visible indication in the remote tire display mode in a first orientation, and provides the visible indication of detected pressure value in the tire pressure gauge mode in a second orientation different from the first orientation.

18. The system of claim 17, wherein tire pressure gauge and remote tire pressure display further comprises a plug adapted to engage with a 12 volt cigar lighter power receptacle of an automobile power connector protruding from the housing at a location appearing to be above a top of the display when the display is operating in the first orientation.

* * * * *